United States Patent [19]

Sudou

[11] 4,183,550
[45] Jan. 15, 1980

[54] AIR BAG HOLDING MEANS IN AN INFLATING TYPE OCCUPANT RESTRAINT DEVICE

[75] Inventor: Youichi Sudou, Toyota, Japan

[73] Assignee: Toyota Jidosha Kogyo Kabushiki Kaisha, Aichi, Japan

[21] Appl. No.: 894,154

[22] Filed: Apr. 6, 1978

[30] Foreign Application Priority Data

Dec. 29, 1977 [JP] Japan .................................. 53-92

[51] Int. Cl.² .............................................. B60R 21/08
[52] U.S. Cl. ..................................... 280/743; 280/731
[58] Field of Search ............... 280/728, 729, 731, 736, 280/737, 738, 739, 740, 741, 742, 743

[56] References Cited

U.S. PATENT DOCUMENTS

| | | | |
|---|---|---|---|
| 3,680,884 | 8/1972 | Stephenson | 280/731 |
| 3,819,205 | 6/1974 | Dunford | 280/731 |

Primary Examiner—John P. Silverstrim
Attorney, Agent, or Firm—Stevens, Davis, Miller & Mosher

[57] ABSTRACT

An inflating type occupant restraint device is disclosed which includes an air bag holder. A gas generator is inserted and arranged in an air bag which is formed at its central part with an opening having a diameter smaller than the outside diameter of the gas generator. An inner peripheral edge around the opening is formed with a plurality of radially extending slits and protrudes inwardly beyond the end of an inner edge of a retainer for mounting the air bag, whereby the shearing resistance of the air bag in an area surrounding the gas generator is increased.

4 Claims, 4 Drawing Figures

AIR BAG HOLDING MEANS IN AN INFLATING TYPE OCCUPANT RESTRAINT DEVICE

This invention relates to an inflating type occupant restraint device which is installed on a steering wheel or in front of an assistant driver's seat in an automobile and which inflates an air bag and protects an occupant in an emergency such as a collision. More particularly, this invention relates to means for holding the air bag and a gas generator in such a device.

Figure 4:
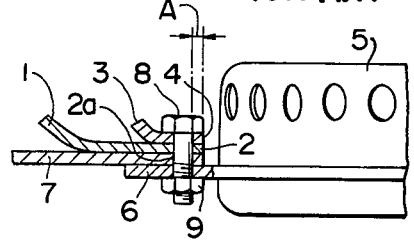

Heretofore, the holding of an air bag and a gas generator in an inflating type occupant restraint device has been as shown in FIG. 4. The end 2 of an opening of the air bag 1 is arranged in a manner to be substantially even with the end 4 of an inner edge of a retainer 3. The end part of the opening is held between a flange 6 of a gas generator 5 and the retainer 3 through a mounting plate 7, and these components are clamped by a bolt 8 and a nut 9.

Unless an accident occurs, the air bag 1 is held and encased in the state in which the components are clamped at first. With the lapse of many years, therefore, that portion of the air bag 1 which is sandwiched in between the mounting plate 7 and the retainer 3 loses elasticity due to a clamping force and undergoes a phenomenon called creep. When, under this condition, the air bag system operates and the air bag inflates, the force of holding the air bag on the mounting plate cannot be expected over the entire area of the abutment between the retainer 3 and the end part 2a of the air bag 1, and it relies only on the shearing resistance of that part of an air bag material in the opening end part of the air bag 1 which has a width corresponding to the diameter of the bolt 8. Accordingly, there is the danger that the air bag will tear from the part of the bolt hole, and the protection of the occupant cannot be perfectly ensured.

This invention has for its object to provide air bag holding means according to which, even if an inflating type occupant restraint device has remained in the initially mounted state for many years and therefore the clamping force of a bolt-clamped part being an air bag mounting part has lowered by the creep phenomenon, the shearing resistance in the vicinity of the clamped part is increased upon operation of the air bag system, whereby the air bag does not tear from the clamped part and the occupant can be safely protected.

Figure 1:
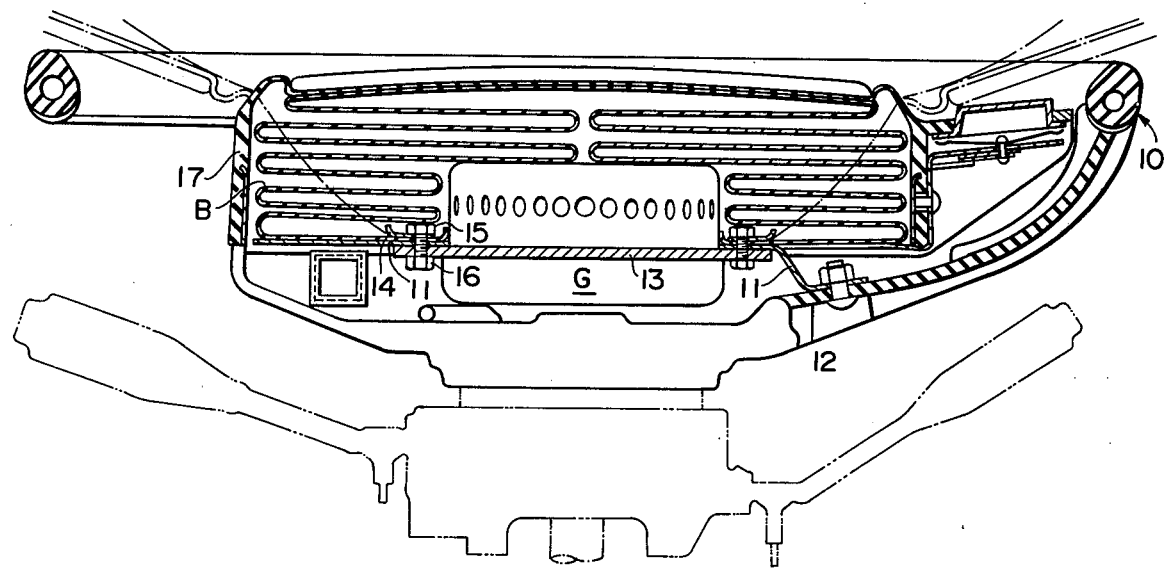
Figure 2:
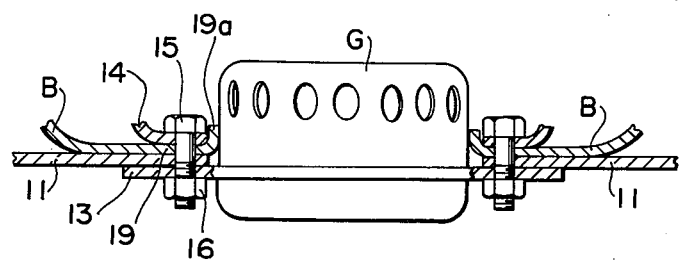
Figure 3:
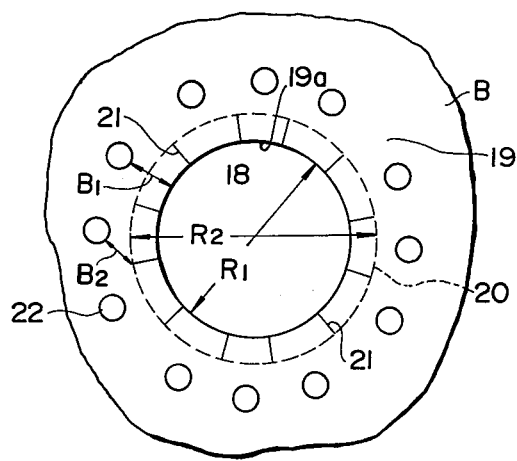

Such objects and features of this invention will be clearly understood from the following detailed description taken with reference to the accompanying drawings in which:

FIG. 1 is an explanatory view in which the air bag holding means of this invention is applied to an inflating type occupant restraint device installed on a steering wheel, FIG. 2 is a sectional view of the essential portions of the air bag holding means in FIG. 1, FIG. 3 is a plan view of an air bag in the inflated state, and FIG. 4 is a sectional view of the essential portions of air bag holding means in the prior art.

FIG. 1 shows an embodiment in which the air bag holding means of this invention is applied to an inflating type occupant restraint device disposed on the central part of a steering wheel.

Referring to the figure, a mounting plate 11 is arranged at the central part of a steering wheel 10. The mounting plate 11 is secured to the base part 12 of the steering wheel 10 by bolting. A gas generator G and an air bag B are clamped and fixed to the mounting plate 11 through a flange 13 of the gas generator G and a retainer 14 by a plurality of bolts 15 and nuts 16 which are appropriately arranged at equal intervals. The air bag B is housed in a case 17 in such a manner that the gas generator G is contained therein. The case 17 is fixed to the mounting plate 11 by screws or the like.

The above construction is the same as the prior art construction in which the inflating type occupant restraint device is arranged on the steering wheel. The feature of this invention resides in the air bag holding portion which is illustrated in the sectional and plan views of the essential parts in FIGS. 2 and 3.

As shown in FIGS. 2 and 3, the air bag B is formed at its central part with an opening 18 so as to insert the gas generator G. As to the air bag B, its end part 19 around the opening 18 abuts on the mounting plate 11 through the retainer 14. As to the gas generator G, its flange 13 abuts on the mounting plate 11. The air bag B and the gas generator G are clamped and fixed by the bolts 15 and the nuts 16. The bolts 15, with heads having a large area of contact with the retainer, are effective from the viewpoint of clamping forces.

As seen from FIG. 3, the diameter $R_1$ of the opening 18 of the air bag B is smaller than the outside diameter $R_2$ of the gas generator G. Thus, an edge 19a of the air bag B around the opening 18 lies inwards of the outer peripheral edge 20, i.e., side wall of the gas generator G before assemblage. For this reason, a plurality of slits 21 which extend from the inner periphery of the edge 19a to, or beyond, positions corresponding to the outer peripheral edge 20 of the gas generator G are radiately cut in the edge 19a of the air bag B around the opening 18 in such a manner that they do not coincide with the positions of the bolts 15 constituting parts for mounting the air bag. The slits 21 are formed in order to permit the gas generator G to be inserted into the opening 18 of the air bag B. Owing to the slits 21, notwithstanding that the edge 19a around the opening 18 lies on the inner side with respect to the outer peripheral edge 20 of the gas generator G, the gas generator G is inserted into the opening 18 of the air bag B by forcibly pushing and inserting the gas generator G because, by the pushing force, the edge 19a around the opening 18 is bent upwards as shown in FIG. 2.

Bolt holes 22 for fixing the air bag B to the mounting plate 11 are formed in the end part 19 of the air bag B and somewhat outwards of the deepest ends of the slits 21.

With the air bag holding means of the prior art, when the air bag has been held for a long period of time, the shearing resistance develops only in an area of a range A as shown in FIG. 4 for the reason described previously. In contrast, according to the above construction of this invention, as illustrated in FIG. 3, the distance from the bolt hole 22 to the inner end of the air bag B is increased, and the shearing resistance acts in an area of range $B_1$ or $B_2$ which is much larger than the area of the range A, so that a sharp increase in the shearing resistance of the air bag end part 19 is achieved.

Although, in the foregoing embodiment, the air bag holding means of this invention is applied to the inflating type occupant restraint device installed on the steering wheel, it is of course applicable to an inflating type occupant restraint device which is disposed inside an instrument panel in front of an assistant driver's seat.

As set forth above, according to this invention, the edge of an air bag around a central opening of the air bag is provided so as to protrude beyond the end of the inner edge of a retainer for mounting the air bag and it is bent upwards along the outer peripheral wall of a gas generator, whereby the distance from a clamping part being a mounting part of the air bag to the end of the edge of the air bag can be sharply increased, in other words, the shearing resistance of the air bag in the vicinity of the clamping part can be conspicuously increased. Thus, even if an inflating type occupant restraint device has been held in the mounted state for a long and the clamping force has therefore lowered due to the creep phenomenon, the inflating force upon inflation of the air bag can be allotted to a large area which extends from the clamping part or bolts to the end of the edge of the air bag. The air bag can be perfectly prevented from tearing from the bolt part due to the inflating force, and the protection of the occupant is ensured.

Further, as described previously, according to the air bag holding means of this invention, the distance from the clamping part to the end of the air bag edge is increased to the extent that the edge of the air bag can be bent upwardly along the side wall of the gas generator in order to increase the shearing resistance of the air bag in the vicinity of the clamping part. Although, upon inflation of the air bag, the bent part is stretched by a tensile force attributed to the inflating force, the bent part can abut on the end of the inner edge of the retainer before it is fully stretched. Also the abutment between the bent part and the end of the inner edge of the retainer can take charge of the inflating force of the air bag. This can remarkably increase the shearing resistance in the vicinity of the clamping part, conjointly with the increased distance from the clamping part to the end of the edge of the air bag.

What I claim is:

1. In an inflatable passenger restraint device having an air bag having a substantially circular opening in the central region thereof and fixing bolt holes radially outwardly of said central opening, a gas generator, substantially circular in transverse cross-section, in the opening, a retainer for mounting the air bag and a securing member for securing the air bag and the gas generator, means extending through the fixing bolt holes for securing said air bag and said gas generator together with the retainer and the securing member, the improvement comprising:
   the diameter of the opening of the air bag being less than the outer diameter of the gas generator, the inner edge of the bag surrounding the opening extending radially inwardly from the retainer and having a plurality of circumferentially spaced substantially radially extending slits therein which extend outwardly from the opening to at least the outer periphery of the gas generator; and
   said slits being at positions not coincident with said fixing bolt holes.

2. In an inflatable passenger restraint device as claimed in claim 1, wherein:
   said slits are substantially equally circumferentially spaced from each other around the opening, said fixing bolt holes are substantially equally circumferentially spaced from each other around the opening, and one of said holes being positioned between each next adjacent pair of said slits.

3. In an inflatable passenger restraint device as claimed in claim 1, wherein:
   said gas generator includes a mounting flange;
   said mounting flange, said retainer and said securing member have bolt holes defined therethrough which register with the fixing bolt holes in the air bag; and
   said retainer, said air bag, said securing member, and said gas generator being secured together by bolts extending through said bolt holes.

4. In an inflatable passenger restraint device having an air bag having a substantially circular opening in the central region thereof and fixing bolt holes radially outwardly of said central opening, a gas generator, substantially circular in transverse cross-section, in the opening, said gas generator having a radially outwardly extending mounting flange, a retainer for mounting the air bag and a securing member for securing the air bag and the gas generator, means extending through the fixing bolt holes for securing said air bag and said gas generator together with the retainer and the securing member, the improvement comprising:
   the diameter of the opening of the air bag being less than the outer diameter of the gas generator, the inner edge of the bag surrounding the opening extending radially inwardly from the retainer and having a plurality of circumferentially spaced substantially radially extending slits therein which extend outwardly from the opening to at least the outer periphery of the gas generator with the portions of the bag between the slits being in abutment with and extending along the periphery of the gas generator in a direction substantially parallel to the axis of the opening; and
   said slits being at positions not coincident with said fixing bolt holes.

* * * * *